United States Patent
Escobar-Olmos et al.

(10) Patent No.: US 9,201,640 B2
(45) Date of Patent: Dec. 1, 2015

(54) LICENSE MANAGEMENT SYSTEM (71) Applicant: INTERNATIONAL BUSINESS MACHINES CORPORATION, Armonk, NY (US)

(72) Inventors: Victor Rafael Escobar-Olmos, Holzerlingen (DE); Jakob Christopher Lang, Altdorf (DE); Tomas Libal, Hradec Kralove (CZ); Angel Nunez-Mencias, Stuttgart (DE); Fabian Romanowski, Karlsruhe (DE); Sven Sterbling, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

(21) Appl. No.: 14/073,002

(22) Filed: Nov. 6, 2013

(65) Prior Publication Data

US 2014/0165053 A1 Jun. 12, 2014

(30) Foreign Application Priority Data

Dec. 7, 2012 (GB) .................................. 1222051.3

(51) Int. Cl.
*G06F 9/445* (2006.01)
*G06F 21/10* (2013.01)
*H04L 29/08* (2006.01)

(52) U.S. Cl.
CPC .. *G06F 8/61* (2013.01); *G06F 8/60* (2013.01); *G06F 21/105* (2013.01); *H04L 67/104* (2013.01); *H04L 67/34* (2013.01)

(58) Field of Classification Search
CPC ........... G06F 21/105; G06F 8/60–8/68; G06F 8/70–8/77
USPC ................................................. 717/174–178
See application file for complete search history.

(56) References Cited

U.S. PATENT DOCUMENTS 6,574,612 B1   6/2003  Baratti et al.
7,171,662 B1 *  1/2007  Misra et al. ................... 717/177
(Continued)

FOREIGN PATENT DOCUMENTS

JP   2010-021615 A   1/2010
JP   2010-218397 A   9/2010
(Continued)

OTHER PUBLICATIONS

Group-Based Content Push with Dynamic Session Startup—Otso Kassinen, Erkki Harjula,Petri Pohjanen,Timo Koskela,Jussi Ala-Kurikka,Mika Ylianttila—University of Oulu—HIT Lab NZ, University of Canterbury MUM 2005 Christchurch, New Zealand—2005.*

(Continued)

*Primary Examiner* — Jason Mitchell
*Assistant Examiner* — Francisco Aponte
(74) *Attorney, Agent, or Firm* — Margaret A. McNamara, Esq.; Kevin P. Radigan, Esq.; Heslin Rothenberg Farley & Mesiti P.C.

(57) ABSTRACT

A license management system is provided for computer program applications, which includes an exchange network connecting a plurality of peer-to-peer network servers, wherein at least one network server of the plurality of peer-to-peer network servers acts as a provider server and at least one network server acts as a user server, and each peer-to-peer network server is configured to perform a method, which includes: controlling program installations according to respective license regulations; storing executable program codes to be distributed to requesting servers; generating, storing, and dispatching a metafile including at least license information on licensing conditions for a corresponding executable program code; sending a request for transmission of the metafile for a corresponding executable program code; downloading and storing a metafile; and downloading, installing, and executing the executable program code under the controlling of program installations according to the respective license regulations.

13 Claims, 7 Drawing Sheets

(56) References Cited

U.S. PATENT DOCUMENTS

| | | | |
|---|---|---|---|
| 7,343,297 B2 * | 3/2008 | Bergler et al. | 705/59 |
| 7,464,270 B2 | 12/2008 | Patanar et al. | |
| 7,676,437 B2 | 3/2010 | Satkunanathan et al. | |
| 7,809,648 B2 * | 10/2010 | Misra et al. | 705/59 |
| 7,890,430 B2 * | 2/2011 | Lopatic | 705/59 |
| 7,925,592 B1 | 4/2011 | Issa et al. | |
| 8,229,859 B2 | 7/2012 | Samid | |
| 8,667,605 B2 * | 3/2014 | Biswas et al. | 726/27 |
| 2002/0138441 A1 * | 9/2002 | Lopatic | 705/59 |
| 2002/0194010 A1 * | 12/2002 | Bergler et al. | 705/1 |
| 2003/0204602 A1 * | 10/2003 | Hudson et al. | 709/228 |
| 2006/0259949 A1 * | 11/2006 | Schaefer et al. | 726/1 |
| 2007/0136817 A1 * | 6/2007 | Nguyen | 726/26 |
| 2008/0091613 A1 * | 4/2008 | Gates et al. | 705/59 |
| 2008/0134348 A1 * | 6/2008 | Gunyakti et al. | 726/30 |
| 2008/0288788 A1 * | 11/2008 | Krig | 713/193 |
| 2009/0187995 A1 * | 7/2009 | Lopatic | 726/31 |
| 2009/0222505 A1 * | 9/2009 | Pavan et al. | 709/202 |
| 2009/0228984 A1 * | 9/2009 | Sterin | 726/26 |
| 2009/0327090 A1 * | 12/2009 | Bhave et al. | 705/26 |
| 2012/0059700 A1 * | 3/2012 | Darbyshire | 705/14.16 |
| 2012/0072995 A1 * | 3/2012 | Crawford | 726/26 |
| 2014/0033196 A1 * | 1/2014 | Biswas et al. | 717/174 |

FOREIGN PATENT DOCUMENTS

| | | |
|---|---|---|
| JP | 2012-008927 A | 12/2012 |
| WO | 2008/030759 A1 | 3/2008 |

OTHER PUBLICATIONS

Search Report for GB Application Serial No. 1222051.03, dated Jun. 13, 2013 (5 pages).

Sharifi et al., "SLDRM: A Self Local License Digital Rights Management System", Digital Ecosystems and Technologies, 2008. Dest 2008, 2nd IEEE International Conference on, Date of Conference: Feb. 26-29, 2008, pp. 369-374.

\* cited by examiner

LICENSE MANAGEMENT SYSTEM

PRIOR FOREIGN APPLICATION

This application claims priority from United Kingdom patent application number 1222051.3, filed Dec. 7, 2012, which is hereby incorporated herein by reference in its entirety.

FIELD OF THE INVENTION

The invention generally relates to a license management system for software products in a peer-to-peer network incorporating a plurality of provider, re-distributor, and client servers.

BACKGROUND

Software products are often distributed and installed over intranet or internet nowadays. The use of software products is in general ruled and regulated by license agreements between provider and user. The provider of the software product wants the user to abide by the license agreement. This implies that the user reads and understands the license agreement for the respective software product. Hence, there is a need for a secure licensing and entitlement system to ensure that the demands of provider and user are precisely matched.

It is known in the prior art to employ software license manager tools to control software products as to their environment and runtime. License managers are also employed for product activation, trial licenses, subscription licenses, feature-based licenses, and floating licensing from the same software package.

In addition license manager tools reconcile software licenses and installed software, and include other helpful features such as device discovery, software inventory, license compliance, and reporting functions, and they increase operational transparency in order to prevent litigation costs associated with software misuse.

Nevertheless, currently the only way to ensure that the license is enforced is requiring a connection back from the user to the software product provider.

The relation between provider and user and the processes of providing products and services is usually complicated and irregular because of the high complexity and variations of the involved processes. Variations may be initiated by the software provider due to business requirements or processes in the production and interaction. For that reason most provisioning processes are highly manual and there exists no real standardization at the moment.

An example for an existing provisioning process is the App Store® by Apple® Inc. It is based on a closed model with a centralized architecture to reduce the complexity. However this approach is exclusively or at least mainly used for simplification of the provisioning to private customers where normally no high complexity is to be expected.

In JP 2010 021615 A a content distribution system and method is described for providing a license management method for a streaming content. A plurality of content distribution servers carry out streaming distribution of an enciphered scramble key used for release of scramble, while they distribute a scrambled content.

From JP 2010 218397 A an information processing apparatus and method is known for easily managing a license while reducing the load on a network by reducing the obtaining time of software.

In U.S. Pat. No. 8,229,858 B1 an enterprise licensing system is provided that includes a licensing agent operable to (a) provide a customer with features and/or capacities, being allocable freely by the customer among first and second computational components; (b) receive an allocation of the first and second computational components; and (c) generate first and second licenses reflecting the first allocation.

In US 2002/0138441 A1 a technique for license management and online software license enforcement is described, wherein individual licenses are provided for regulating the use of a software product, and the software product is individualized while being downloaded from a license server. The execution of each individualized software product is monitored in agreement with the individual license terms corresponding to the individual software download.

However, in this prior art the license file is unambiguously assigned to a specific user and location. Yet, registration of every user implies a large work load and considerable security requirements on the side of the product provider. In addition, monitoring data of a huge plurality of users implies considerable traffic on the network and necessitates permanent presence of all participants on the network. Moreover, the prior art is silent on the issue of handling updates of software products.

In US 2008/0288788 A1 a digital rights management is disclosed that is based on metafiles for managing digital rights.

In general, in the prior art the computer system that wants to employ software under license must necessarily have an internet connection in order to register the software product at the provider. The license record is processed on the receiving computer system. Additional requirements may be imposed on the system from outside, e.g. the licensor, depending on the nature of the license. In summary, the involved procedures are rather complex and inconvenient to handle.

Hence, there is a need to improve the hitherto known License Management Systems so as to achieve a secure, self contained process for provision of software products to a user and to guarantee observation of license agreements at the same time.

BRIEF SUMMARY

The present invention provides, in one or more aspects, a license management system for computer program applications, the system including an exchange network connecting a plurality of peer-to-peer network servers, wherein at least one network server of the plurality of peer-to-peer network servers acts as a provider server and at least one network server of the plurality of peer-to-peer network servers acts as a user server, and each of the plurality of peer-to-peer network servers is configured to perform a method which includes: controlling program installations according to respective license regulations; storing executable program codes to be distributed to requesting servers; generating, storing, and dispatching a metafile including at least license information on licensing conditions for a corresponding executable program code; sending a request for transmission of a metafile for a corresponding executable program code; downloading and storing the metafile; and downloading, installing, and executing the executable program code under the controlling of program installations according to the respective license regulations.

In another aspect, a method is provided for running a license management system, which includes: controlling program installations according to respective license regulations; distributing executable program codes to requesting servers from storage; generating, storing, and dispatching a metafile including at least license information on licensing conditions for a corresponding executable program code; sending a request for transmission of a metafile for a corresponding executable program code; downloading and storing the metafile; and downloading, installing, and executing the executable program code under the controlling of program installations according to respective license regulations.

In a further aspect, a computer program product for a license management system is provided. The computer program product includes a computer readable storage medium readable by a processing circuit and storing instructions for execution by the processing circuit for performing a method, which includes: controlling program installations according to respective license regulations; distributing executable program codes to requesting servers from storage; generating, storing, and dispatching a metafile including at least license information on licensing conditions for a corresponding executable program code; sending a request for transmission of a metafile for a corresponding executable program code; downloading and storing the metafile; and downloading, installing, and executing the executable program code under control of the controlling of program installations according to respective license regulations.

BRIEF DESCRIPTION OF THE SEVERAL VIEWS OF THE DRAWINGS

In the following, embodiments of the invention will be described in greater detail by way of example only making reference to the drawings in which.

DETAILED DESCRIPTION

In the following, like numbered elements in these figures are either similar elements or perform an equivalent function. Elements which have been discussed previously will not necessarily be discussed in later figures if the function is equivalent.

It is a purpose of the present invention to create a flexible business-to-business (B2B-) solution in order to facilitate the end-to-end provisioning process. Browsing products (like in catalogues or web stores) that are offered by providers is made possible by a direct connection to the back-end processes which are needed to acquire product features. Upon selection of products (e.g. software) by the customer, the product and product features can be deployed automatically on the customer's computer.

Figure 1:
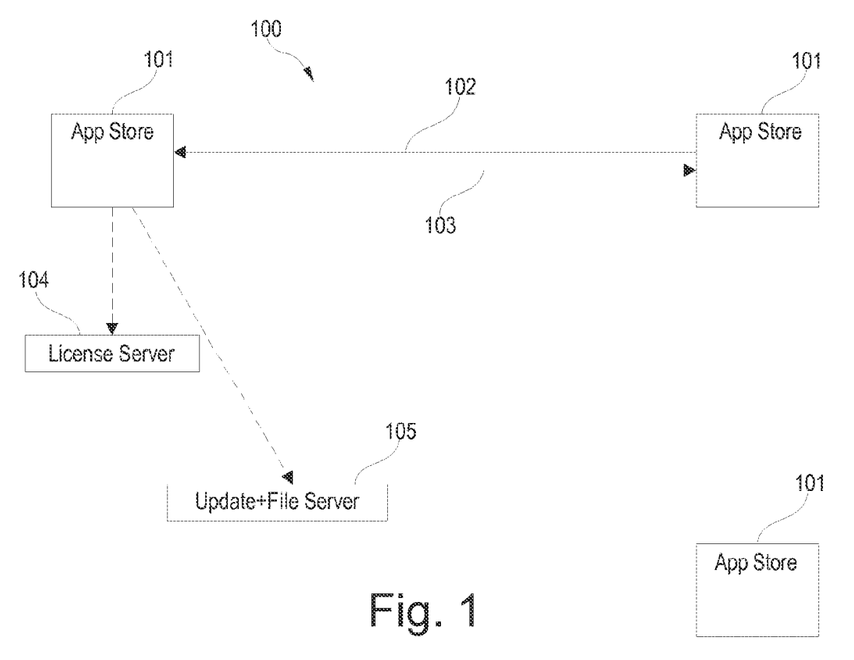
FIGS. 1-4 illustrate a procedure for product provision and license management according to one embodiment of the present invention.

The license management system according to the invention will be described in the following with reference being made to FIGS. 1 to 4. In FIG. 1 there are shown three network servers 101, which are linked to each other in a provider and user network 100.

If one of the network servers 101 has become aware of a software product that is offered by another network server 101 it sends a request 102 to the respective server 101. The addressed server 101 answers the request by transfer 103 of a metafile. At the same time or at an earlier time a license server 104 and an update-file server 105 are and have been informed respectively of the dispatch of metafiles. The prior communication between server 101 and license server 104 and update file and server 105, respectively, is indicated by dashed arrows in the Figures.

Figure 2:
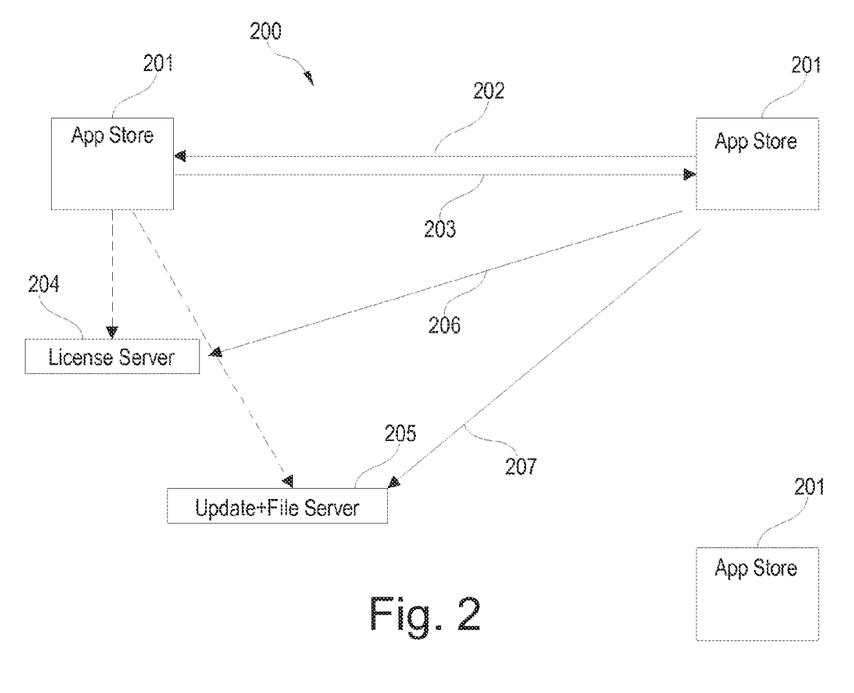
Figure 3:
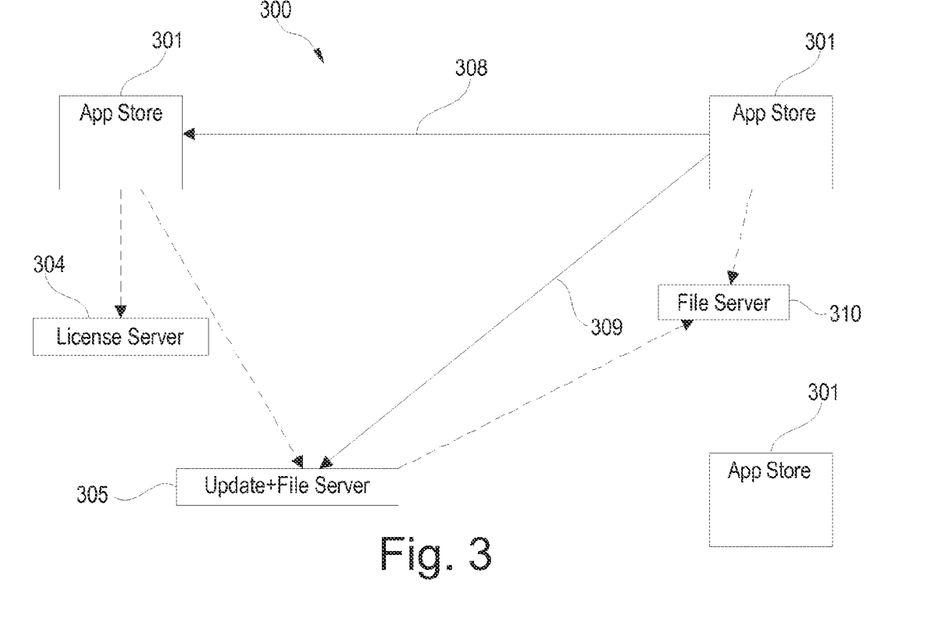

The following procedure is illustrated in the network 200 of FIG. 2. Once the requesting server 201 has sent its request 202 and is in possession of the metafile 203 it presents the general approval 206 of the offering server 201 as extracted from the metafile 203 at a license server 204 and gets the corresponding license in return. The license server 204 had been informed of the request and of the dispatch of the metafile by the server 201 before, which process is indicated by dashed arrows in the Figures. The information of the license server 204 and the update-file server 205 may concern a single metafile dispatch or may be a general notice that a particular software product has been offered and the provider 201 will distribute metafiles as requested from now on. With the valid license the requesting server 201 sends a request 207 for downloading and installing of the desired software product to the update-file server 205.

Instead of downloading the software product file from an update-file server this may also be accomplished by downloading the file from the provider server itself. Such scenario is illustrated in network 300 of FIG. 3. The requesting server 301 directs its request 308 to the provider which supplies the file after the license has been approved. While this is the more direct way of providing the desired software product, in an alternative the requesting server 301 is referred to the update-file server 305 for downloading. In this case, server 301 sends the request 309 to the update-file server 305 and in return gets the desired software product. This rather indirect provision necessitates communication between provider server 301 and update-file server 305 as indicated by a dashed arrow. Still another alternative is the file transfer via an intermediate file server 310. This procedure may be considered beneficial if the update-file server 305 is likely to be overloaded and therefore files are swapped out. The respective communications messages between requesting server 301, update-file server 305, and intermediary server 310 are indicated by dashed arrows in FIG. 3.

In the above scenarios only two active servers are involved. The other servers that were mentioned above only serve as storages and buffers. However, the invention is not limited to the exchange of products between two active servers only. Instead, the receiving server may be entitled to re-distribute the acquired software product. The entitlement to do so is of course subject to the license which the receiving server has been granted by the provider server.

Figure 4:
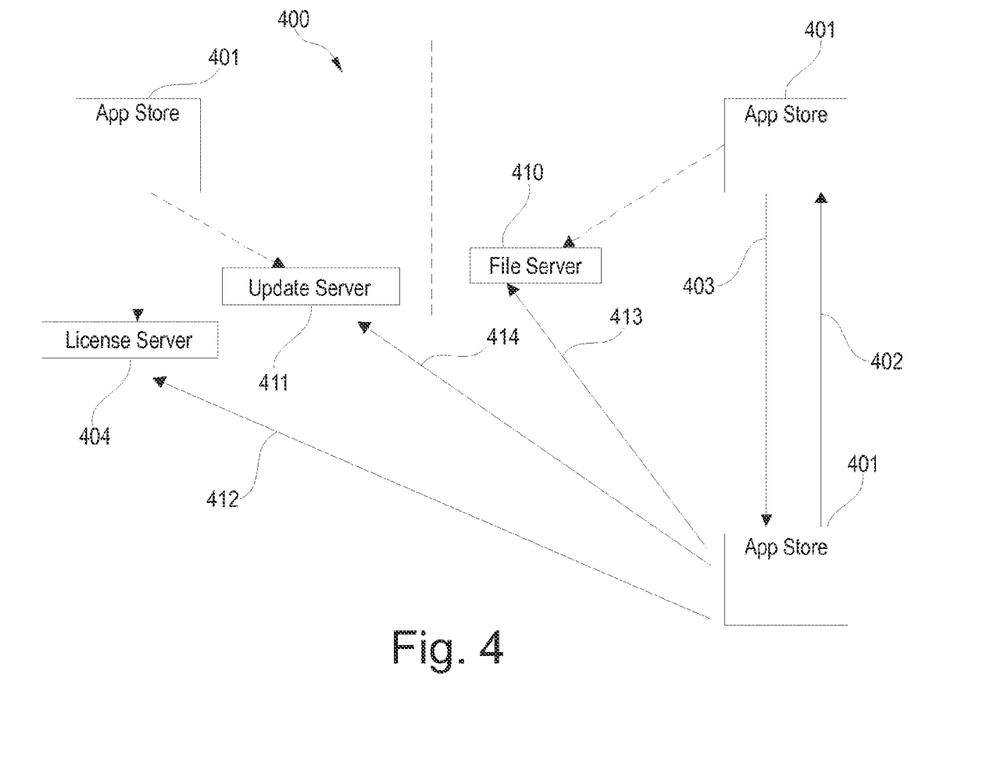

In FIG. 4 re-distribution of an acquired software product by the receiving server 401 in the provider and user network 400 is shown. Once the receiving server 401 top right in FIG. 4 is in possession of the software product there may be sent a request 402 from the server 401 down right in FIG. 4. The server 401 top right sends a metafile 403 to server 401 down right in return. Based on this metafile 403 the server 401 down right is entitled to request a full license from a license server 404 by sending an according request 412 to the license server 404. The software product is downloaded then from file server 410 in a file download process 413. In case there are updates available for the purchased software product the downloading server is informed about it and the updates may be obtained from an update server 411 by request 414. License server 404 and update server 411 are still under control of the provider server 401 top left in FIG. 4. File server 410 however gets its instructions from the re-distributing server 401 top right in FIG. 4.

Note that there is no communications necessary between re-distributor and provider when the software product is re-distributed. This separation as to communications between re-distributor and provider is indicated by a vertical dashed line in FIG. 4. The separation of re-distributor and provider is reasonable since the software product that had been purchased by the re-distributor from the provider is in the ownership of the re-distributor now, and it is the re-distributor who is responsible for state and usability of the software-product. In other words the re-distributor is liable to the subsequent purchaser for usability of the software product.

A license management system according to aspects of the present invention is based on server architecture comprising an abstract import layer for the import of features from several feature sources or catalogues to the local system. An internal/external use layer allows the system to either use the acquired features internally or (re-) distribute them via various output channels. Depending on the respective purpose multiple agents can be plugged-in. One option for the export is a direct connection to the import layer of another compatible software system.

Import of product features means import of self produced software features, of software features from other systems, and of software features from other companies, respectively. Internal/external use of products means internal use of the product like deployment by the importing system, redistribution or sale to another system from the same platform, e.g. to a company which does not use the platform, and any other use, respectively. The whole process is integrated into the business processes of the importing system and the interaction between the systems creates a provider customer network emulating the current real network of customers and providers.

In the following, an embodiment of the invention will be described with reference being made to FIG. 5. A license key in this system consists of a unique identifier and some data associated with this identifier. The data contain for example information that simply distinguishes between "entitled" and "not entitled" (i.e. the right to use an application x on a system or not). The data may also contain the number and type of resources that are allowed for use (e.g. application y can run on up to 5 processors and claim up to 3 GB of memory). Still further, the data may include information on the expiry of the license (e.g. the right to use application z until Dec. 31, 2012, but no longer). For a skilled person many more applications of the present invention are obvious.

By using a 'Key-Value-Length' format for the license key, the exact content of the license keys is transparent to the license management system 500 according to one or more aspects of the present invention. License keys contain encrypted parts that are created using standard encryption techniques. Keys from various sources such as software or hardware vendors 501 (License Seller 1, 2, 3 in FIG. 5) can be employed and may be limited to a given computer system 502 or Operating System referring to the system serial number or some other unique identifier. The keys are stored in encrypted records on the license seller side. Each license seller has his own encrypted record memory.

For the installation of a product the user installs an encrypted license key on the computer system. Multiple independent license keys may be installed over the time. The keys can be loaded from external media (USB stick, CD . . . ) or from the web or may be typed in via GUI. The computer system receives the encrypted license keys, decrypts and validates them in a first decryption and validation means 503. The validation process can include the verification that the key is valid for this system serial number, and that sufficient resources are available in the computer system to run the newly licensed software. If decryption and validation is successful, the license keys are stored in a central secure license repository 505, i.e. a permanent storage License Database. In this license repository 505 multiple license keys can be stored and individual license keys can be updated or removed from the repository 505 without affecting the other license keys in the repository. The central license repository 505 is not accessible to the user; it is encrypted, and it is therefore protected against fraud. The license database 505 is self contained and requires no web server access in order to verify a license. The verification of the license at a later time is conducted by a second decryption and validation means 506.

An Application Programming Interface (API) 507 is provided to query license information from the central license database. This API can be used by application programs 508, the Operating System or even Hardware/Firmware to determine whether a certain function is allowed, or whether an application program may be loaded and for how long it may be used. The API 507 retrieves license information from the license database 505, decrypts and validates it in the second decryption and validation means 506 and hands it back to the caller, i.e. the application program 508 that runs on the computer system 502 of the user. The secure API 507 is protected against manipulation of the results: for example, the communication between database and application programming interface (DB-API communication) is secured by decryption on each API call. The communication may also be secured by a trusted environment. Still another alternative is securing the API by signature. Since the API is always available, no network access is required.

Depending on the results of the API license query a chosen software function on the computer system is executed or denied. Meaningful error messages to the user can be generated by the instance that issued the API license query in case a function is not entitled to run on this system. In addition, the API license query can be issued repeatedly after predetermined time intervals in order to validate the license and react accordingly upon its expiration.

If the computer system 502 of the user acts as a vendor system a license file is created and the respective data are merged and encrypted in a merge and encryption means 504 that is located between database 505 and interface to the server network.

Figure 5:
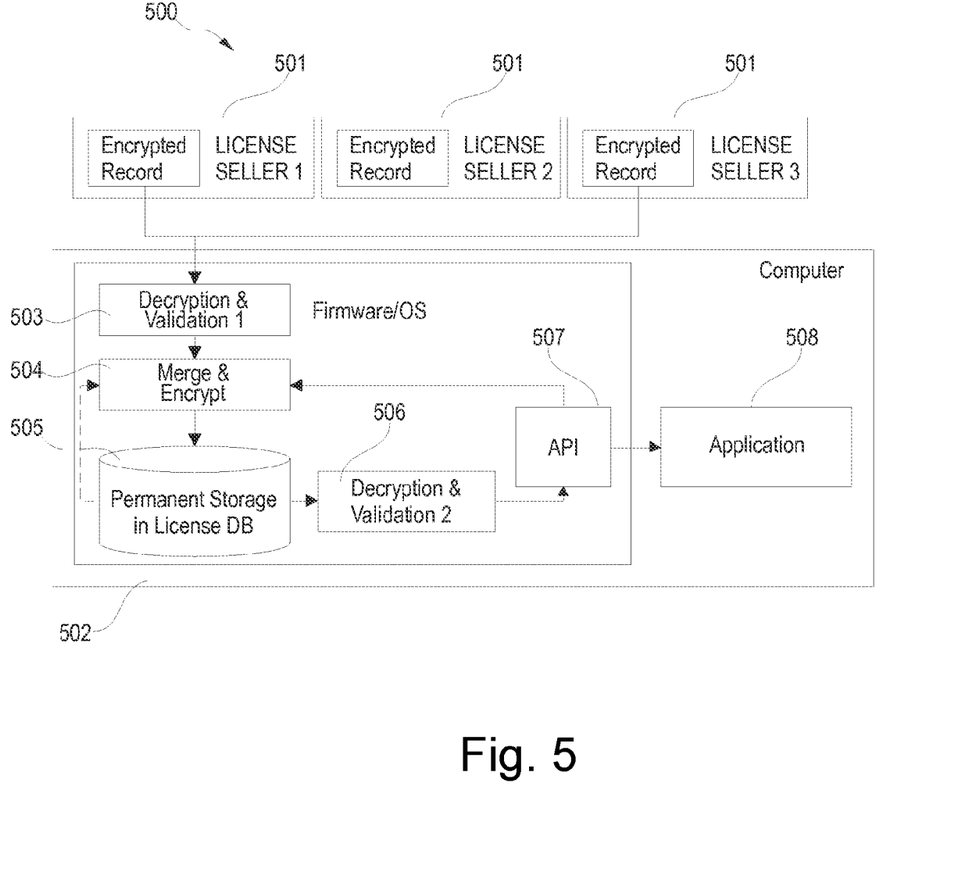
FIG. 5 depicts one embodiment of a license management system, according to one or more aspects of the present invention.

The invention provides a software system to run the license management system of FIG. 5 which creates and manages a network of interacting providers and customers. Every participant may take on either role (provider or customer) at any time and there is no limit or prerequisite to their activities inside the system network. The network connecting the users of the system is decentralized and there is no need for a global manager or agent and no need for a steady-state connection to a central control entity.

In the following an embodiment of a method for handling connection-, license- and rights management according to one or more aspects of the present invention will be described with reference being made to FIG. 6.

The management method is based on metafiles in a distributed and decentralized environment. Such metafile is issued and delivered by a product provider, independently of but in connection with the product itself.

The metafile is a signed file, in which a license to the product is encoded. Apart from formal license requirements the metafile contains the location of the file product or feature product that the customer is about to buy and install. There may be an option as well to include additional license enforcement plug-ins in the metafile.

The metafile is distributed through a trusted product provider store, called provider server in the following. The trusted provider server runs in a trusted environment and is able to process the signed license file in order to enforce the license. The trusted provider server is furnished so as to handle the formal license language, and, if present, to execute the additional license enforcements plug-ins.

For realization of the method according to the invention the following prerequisites must be fulfilled. The trusted provider server is assigned a unique unified identification (UUID). For example, if the store has been approved and appointed by a certification centre, the provider server may get the UUID from the certification centre. For the encryption of the connection part in the metafile a mechanism may be provided that prevents the metafile from being decrypted by anyone else but the targeted provider server. Moreover, the key may contain the UUID. Further, only the issuer of the metafile (i.e. provider of the feature) is entitled to create and change the license part. However, if the targeted provider server is a reseller it may change the source address of the app product, i.e. change the URL on the internet where the source file is to be found for downloading. This of course requires the consent of the metafile issuer.

If the software is delivered from the trusted provider server, e.g. to an external medium, it is encrypted through the unique unified ID. The UUID is necessary as key for the installation of the software product from an external medium. If the software is deleted a signed report is created and may be saved in the enterprise feature store (EFS) again in order to make the license available again.

In the following example it is assumed that the metafile UUID was issued by the target trusted provider server. The (signed) license part of the metafile requires that the product must not be used in Afghanistan. If a request originates from India, however, then the request is directed to URL download sources with India specific conditions which are explained below. Further it is required that only mainframe computers of type Y are supported. Still further it is required that the file product is only active during the weekend for 10 minutes.

The (encrypted) connection part of the metafile contains a URL to a license server, a URL to the provider of the feature, i.e. location of the feature to download, a URL where updates will be provided, and a URL for an additional India license. In this example India is only allowed to use it for 5 minutes a day.

Figure 6:
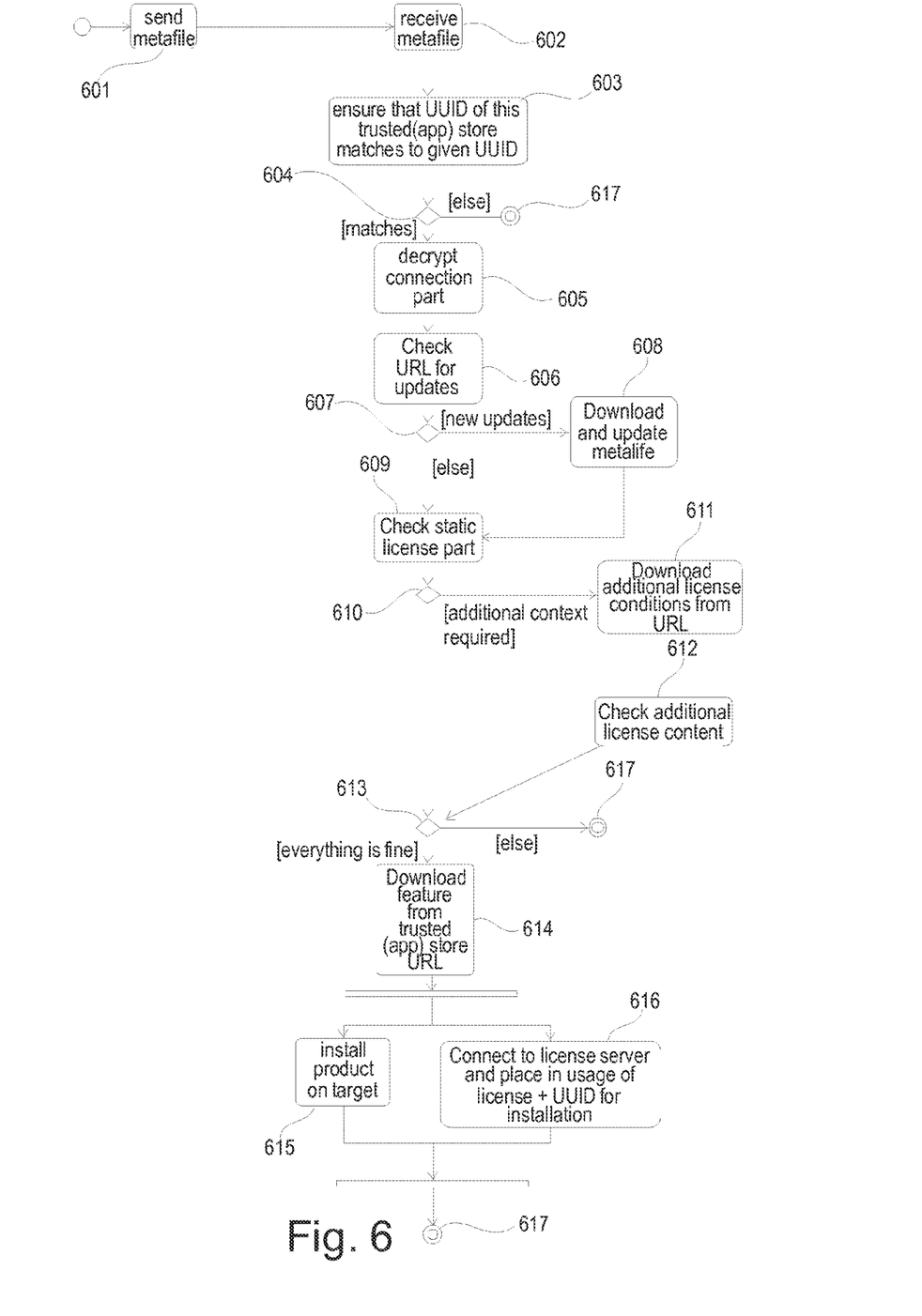
FIG. 6 is a flowchart of a procedure, according to one or more aspects of the present the invention, that is carried out by servers involved in the product provision and license management.

A process of installing a new feature from an provider server is illustrated in FIG. 6. A software provider issues a metafile in step 601. Once the trusted provider server has received the metafile in step 602 it examines the metafile in step 603 and verifies that the UUID of the metafile matches to the given target EFS. If it has been verified in step 603 that the UUID matches to the given target EFS, in step 605 the connection part is decrypted and the process continues. Otherwise, if verification in step 603 was not successful, the procedure exits in step 604. After step 605 the extracted URL is checked for updates. If there are updates available to the software product the procedure branches off to a second download and update of the metafile at step 608. The procedure re-enters its ordinary course in step 609 where the static license part is examined. Additional license conditions are downloaded from the extracted URL at step 611 if it is decided at step 610 to branch off. Otherwise the procedure continues at step 613. Once the additional license conditions have been downloaded at step 611 the additional license content is examined at step 612 before the procedure re-enters the ordinary course at 613. If at step 613 a fault is detected the procedure is terminated. Otherwise the software product is downloaded from a trusted provider server at step 614. Upon completion of step 614 either the software product is installed on the target system in step 615 or a connection to a license server is established in step 616 and the feature is "registered". After installation and successful registration the procedure is terminated at step 617.

Physical resources are provided to prevent external abuse. The metafile contains multiple separate parts: A first part relates to the connection itself. It grants rights to a specific server to connect to the one who created this file. It hands in the connection URL or similar. A link to the server controlling the licenses is provided. A link to the location or pool of the feature is stored.

A second part relates to the license. Specific rules are provided for the feature. It is determined whether or not it is a "normal" license.

A third part relates to rights and legal aspects. Approval is given that the feature is usable inside the infrastructure and location of the server.

With all information in one hand through inference with logic languages additional value is possible. License can be bound through the connection information to a specific license server. By this a decentralized license management is easily possible and other aspects can be considered as well.

In summary, a general license file is created which is not specified for a specific user or location. An update mechanism of licenses is provided to prevent damages and misuse. Registration has been reduced to the certified and trusted provider server instead of every customer/subject. It is no longer necessary to monitor the deployed software, but it is only checked when the installation is done or the software has been deleted. All steps are covered in a single file reducing a lot of traffic between the systems. Furthermore the license servers don't have to be connected with each other.

The system according to the invention is applicable to all computer systems or telecommunication devices, which need licensing information such as Mainframe servers, personal computers (PC, laptop . . . ) smart-phones and their apps.

Some selected applications will be described in the following with reference being made to FIGS. 7 to 11.

Figure 7:
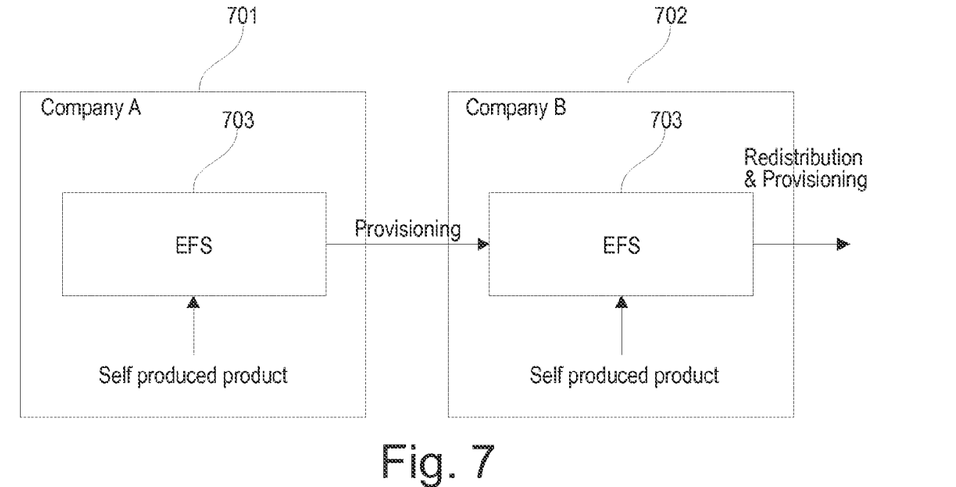
FIG. 7 is a schematic diagram of one embodiment of product flow, according to one or more aspects of the present invention.

FIG. 7 is a schematic diagram of product flow between participants in a peer-to-peer server network in which any participant can take on either role of provider and user. The relation between provider and user and the process of transferring goods and payments is highly complex. Yet the essential relationships may be summarized as shown in FIG. 7. Two companies, namely company A 701 and company B 702 exchange goods and payments and take part in the market. For instance, company A 701 offers self produced software products through an enterprise features store 703. Company B 702 is interested to integrate the offered software product in the own system. The software product is thus delivered from company A 710 to company B 702 directly from the EFS of company A 701. Company B 702 may use the software product from company A 701 exclusively now, or it may redistribute the software, or, if allowed, it may share the software product with one other or multiple other network servers. In addition it may the software purchased from company A 701 in connection with own software products to third parties. These options are indicated in FIG. 7 by respective arrows referred to as "Provisioning" and "Redistribution and Provisioning".

Figure 8:
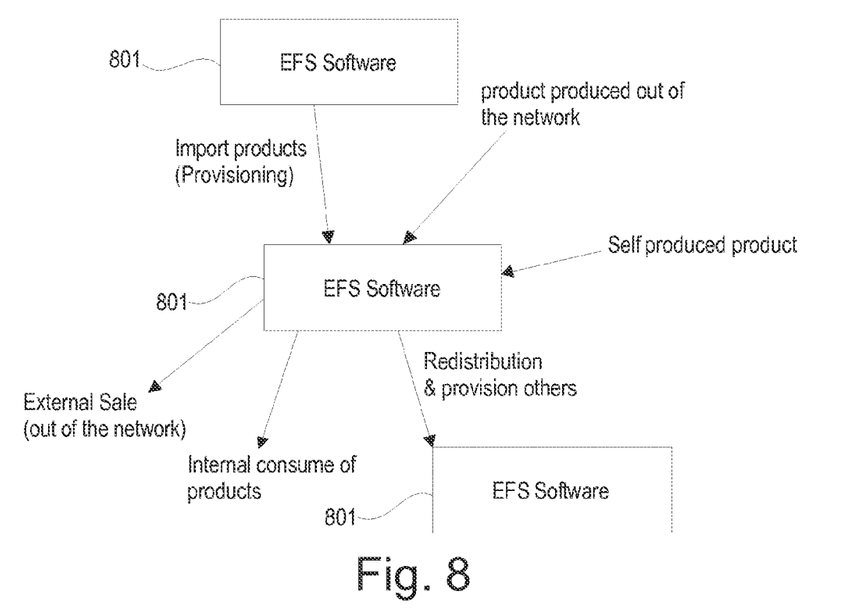
FIG. 8 is a more abstract diagram of one embodiment of product flow, according to one or more aspects of the present invention for a store network.

A more abstract diagram of the product flow is illustrated in FIG. 8. FIG. 8 shows a section of a store network where the participating servers in the network are reduced to their respective enterprise feature stores 801. Said enterprise feature stores 801 are in fact storage means for executable programs. The possible transactions in this network section are an import of products ("Provisioning") from a first EFS 801 to a second EFS 801 as well as an import of products from outside the network to the second EFS 801. A third option is the import of self produced products in the second EFS 801.

The second EFS 801 in the diagram of FIG. 8 may export products either to an external partner outside the network ("External Sale out of the network") or deliver it for internal use ("Internal consume of products"). A third option for the second EFS 801 is a re-distribution of acquired and self produced products to a third EFS 801 inside the network ("Redistribution and provision others").

Figure 9:
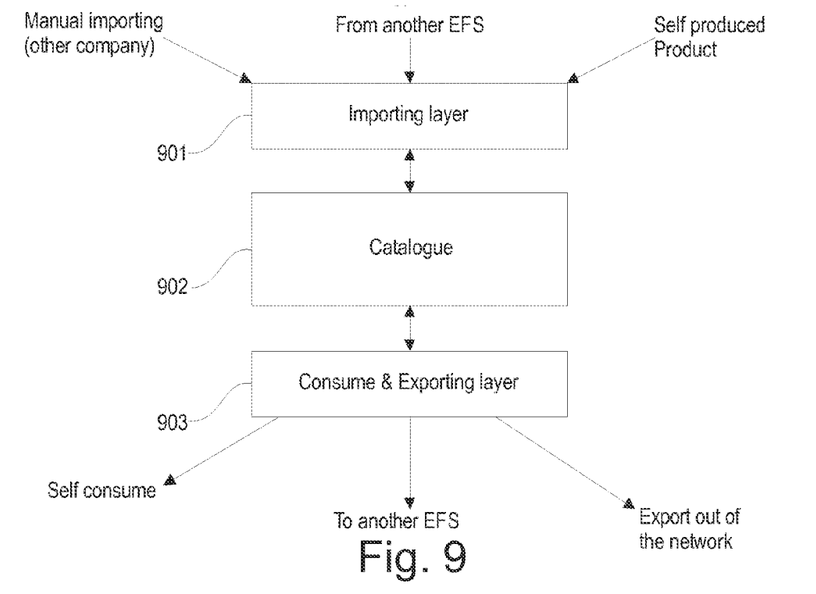
FIG. 9 schematically depicts one embodiment of a stack of involved layers in a network server, according to one or more aspects of the present invention.

Details of data handling inside a network server are indicated in FIG. 9. FIG. 9 schematically depicts a stack of involved layers in a network server. An import layer 901 is the first element for data coming in from the upstream side of the EFS 900. Data coming in may originate from another EFS (referred to as "From another EFS") or from an internal source ("self produced Product") or from outside the network ("Manual importing, other company").

The import layer 901 is directly connected to a features store 902 that is referred to here as catalogue. The catalogue 902 is a storage means for executable programs that either are to be completed by software products from external sources or that are offered to other servers and users in the network. Hence, the catalogue 902 is, apart from the import layer 901, also connected to an export layer 903 for the distribution of software products to other participants on the network. The term other participants includes the server itself in which the EFS is located. Correspondingly, from the export layer 903 the product software may also be delivered for internal use by the respective server ("Self consume"). An alternative distribution channel is the delivery to another EFS on the network ("To another EFS"). A third option is the delivery to a recipient outside the network ("Export out of the network").

The manual import of files is executed as follows. The user selects the import option. Thereafter the user chooses the desired file in the file browser. Then the user chooses the license file in the file browser and defines required parameters such as tags/Name/ . . . in the EFS. Finally the import of the file is started via FTP/ . . . to the catalogue 902.

The import of a file from another EFS is executed as follows. At first an authenticity check of the provider is executed. Thereafter the import of the file to the catalogue 902 is carried out as well as the import of meta-data related to that file.

Finally the export of files to another EFS is described in the following. First the selected file and the license for export are prepared. Thereafter an EFS connection file is attached. A connection to the import layer is established, and the file and attachments like meta-data are sent.

It is to be noted here that the communication between catalogue 902 and import layer 901 as well as the communication between catalogue 902 and export layer 903 is bi-directional. The communication with elements outside the server, i.e. via import layer 901 and export layer 903, respectively, however is uni-directional. Both types of communications channels are indicated by simple and double arrows in FIG. 9.

Figure 10:
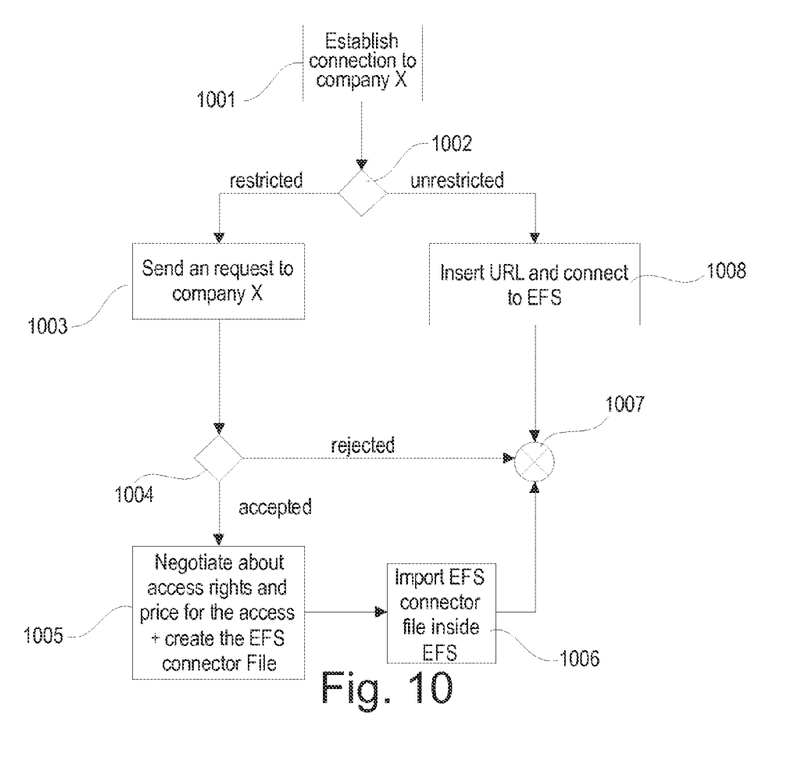
FIG. 10 shows a part of a request procedure that is launched by a requesting server, according to one or more aspects of the present invention.

FIG. 10 shows a part of the request procedure that is launched by a requesting server. Upon decision to acquire new software products from a particular participant on the network the requesting server establishes a connection to said participant on the network at step 1001.

In step 1002 it is checked whether or not the addressed EFS is open, i.e. freely accessible. If so, just a valid URL is needed, and the according URL is taken as address and the connection to the EFS is established in step 1008. In the negative, the procedure branches at step 1002 and a request is sent to the addressed server, i.e. participant on the network, at step 1003. The request may either be accepted or rejected from the addressee. Depending on the response from the addressee the procedure will consequently branch off at step 1004 to terminate at step 1007, if rejected, or will continue at step 1005, if accepted. In step 1005 negotiations are started about details of the transfer, namely access to rights and price for the product. Once these issues have been settled the procedure continues at step 1006 with the import of an EFS connector file inside the EFS. If the EFS turns out to be restricted, specified EFS connection files must be used. The specified EFS connection file is certified by a provider, and in particular it contains regulations of rights to access. Upon completion of all steps the procedure exits at step 1007.

As should have become clear from FIG. 10 the procedure relies on the exchange of rights management data. These data are encoded in particular files termed metafiles.

Figure 11:
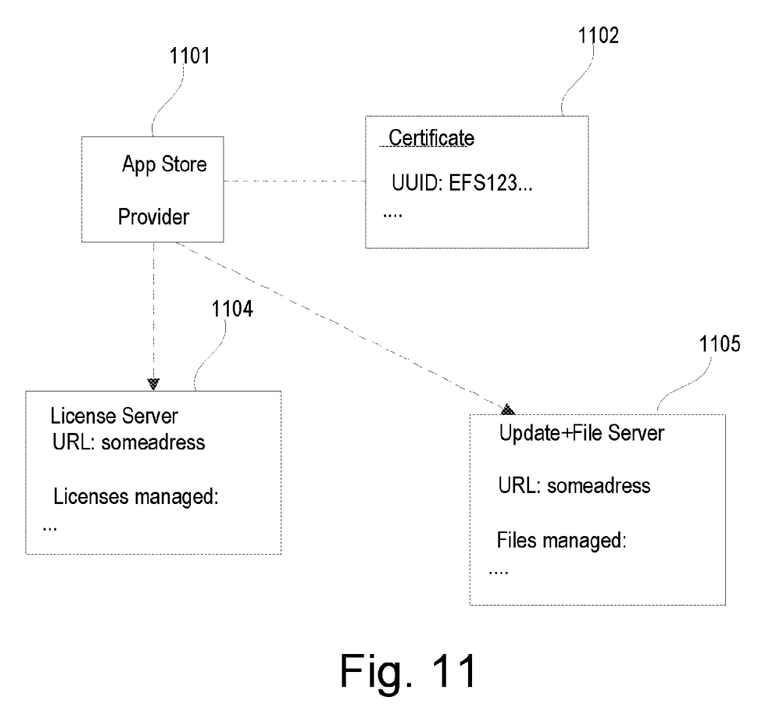
FIG. 11 shows schematically one embodiment of a process of creating a metafile, according to one or more aspects of the present invention.

FIG. 11 shows schematically the process of creating a metafile. A metafile is created by an provider server 1101 that is the provider or distributor of a software product. The metafile is based on a certificate 1102 that may be issued by a certificate trust center (not shown). The certificate 1102 contains information like a unique identification number UUID which is indicated in FIG. 11 as "EFS123 . . . ". The metafile and the information therein are made available to a license server 1104 at which users have to apply for a license if they want to use the offered software product. Also an update-file server 1105 is supplied with the information that forms the contents of the metafile. The server 1105 can verify then whether or not a user request for downloading the software product is covered by the license that is quoted by the requesting user. If so the download will be granted, otherwise the attempt to download the software will be rejected.

The details of the metafile procedure are briefly summarized in the following. The metafile is used for secure communications taking into account the authentication, privacy, reliability, and trusting at the exchange of messages. According to one or more aspects of the present invention metafiles are applied to certification of distributors and re-distributors. If a company wants to use the app store solution provided, it sends a request to the distributor of a centralized organization. The organization checks the company and creates a signed certificate. The certificate consists of: universally unique identifier (UUID) for the new distributor, a location where the distributor will be used, specified rights for the use of the distributor, a private and public keys pair (RSA or other) wherein the private key is used for signing and the public key for one way decryption. As an example the certificates may include, apart from an ID number like EFS123XOP-123-fGX-oF the company's name, its location, its reseller status, a key, and a signature.

The certificates are stored inside the distributor store. Now the distributor store is a trusted distributor store, and the certificate may be used as a public/private key. State of the art cryptography may be employed to ensure the identities of the different distributor stores and to furthermore make sure that each distributor store in the network can be uniquely identified.

The exchange of certificates is executed like the SSL protocol with a server infrastructure that is based on trusting. Distributor store of company A that is certificated exchanges certificates with company B that is also certificated. The certificate of company A is verified by a certificate server, i.e. a store vendor or a trusted authority. The certificate of company B is in the same way verified by the authority. Each distributor store can certify itself to other distributor stores via challenge-response for example including public key algorithms.

The metafile is created by providing the distributor store of the provider access to the license server and a server that manages updates on the metafiles and in addition manages the binaries that belong to the products offered through the distributor store. New product binaries are stored inside the distributor store while the storage of the file could be located on a different server. First it is checked if the binaries are already inside the pool through the UUID created during exportation/installation of the product, which may be termed "wrapped around the UUID". The URL addresses to the binaries are created and stored. Licenses and updateserver etc. is created by use of a logical language. Once the metafile certificate is attached to the feature it cannot be detached later. This is ensured by the trusted distributor store environment.

An example of a metafile for a software feature X may include a number AllowedID: EFS456*, a number CreatorID: EFS123 (signed by creator), a specification named "Static license: (Enc with private key)", the condition "Not allowed inside Australia", a comment "If company is company z then download additional license part from URL_Lic_CompZ", a time restriction "Only usable 10 minutes per day", a time and geographical restriction "If country is China only usable on weekends", a resource restriction "Maximum runnable on 4 CPUs+plugins for special cases", an encryption restriction "Connection: (1.Enc with private key+2 Enc with key from trust org.+3.Enc with public key comp request feature)", multiple URL restrictions like "URL_License_Server=license.server.this; URL_Update_Server=someadress; URL_APP-Store=someadress; URL_Lic_CompZ= . . . "; and an additional comment like "IMPORTANT: The encrypton is done always when a request comes in WITH the Public key passed from the requestor. Remember we can be sure that the public key matches to the requestor because of the trusted certification!!!".

The creatorID stands for the company or person that is officially the creator of this product. Therefore he has to sign every metafile with his private key. If a metafile is created that is wrong this may be backtracked to the distributor store from which it originates and may implicate elimination of the distributor from the trusted environment. This is only possible because if a creator is indentified in the metafile a request has to be sent to this company to verify the claim. Otherwise the metafile is not useable. The only way to circumvent this safety means would be claiming oneself the product creator.

It is important to understand that as long as one is inside the trusted distributor store environment licenses cannot be tampered with and their enforcement is safe. If files come from outside this trusted environment the risk of piracy is still acceptable, but not 100%. If a piracy case has become known the formerly trusted distributor store is excluded from the network and the trusted environment is restored.

One of the most essential benefits of the present invention is the decentralized connection between customers and providers without any centralized regulation by a separate software system.

In a software system the advantage of the present invention is an enhanced end-to-end integration between business partners. With the adaptation to the back-end processes of the involved customers the highly manual and complex process can be facilitated in a non-centralized way. This means the customer can adapt the feature store to his/her needs.

Other benefits of the solution are as follows: With one metafile only there is no need for redundancy information anymore. The software product is easy to update. The invention offers a generic approach, that is, one license file is adapted to the respective application. It further saves bandwidth and reduces the search for locations that are needed to continue with the process. Different license servers need not be connected constantly because each trusted provider server selects a license server that manages the specific feature license. If a change occurs an update is easily feasible due to the single file approach. The license validation is more precise and reliable because of the certification of the trusted provider servers. On the other hand due to the above security enhancement measures the software product is hard to forge. Since the invention is a decentralized approach it is not required that a single server surveys all steps as it is shown in the example. Due to the UUID that is required for the installation the system can guarantee that the license is not used too often.

The present invention provides a License Management System that is based on encrypted records to control provision and licensing of software products.

The present invention provides, in one or more aspects, a license management system for computer program applications, the system including an exchange network connecting a plurality of peer-to-peer network servers, wherein at least one network server of said plurality of peer-to-peer network servers acts as a provider server and at least one network server of said plurality of peer-to-peer network servers acts as a user server, and each of said plurality of peer-to-peer network servers comprises: software license management means for controlling program installations according to respective license regulations; storage means for executable program codes to be distributed to requesting servers; means for generating, storing, and dispatching a metafile including at least license information on licensing conditions for a corresponding executable program code; means for sending a request for transmission of a metafile for a corresponding executable program code; means for downloading and storing a metafile, and means for downloading, installing, and executing said executable program code under control of said software license management means.

The present invention further provides, in one or more aspects, a method for running a license management system, which method comprises: controlling program installations according to respective license regulations by software license management means; distributing executable program codes to requesting servers from storage means; generating, storing, and dispatching a metafile including at least license information on licensing conditions for a corresponding executable program code; sending a request for transmission of a metafile for a corresponding executable program code; downloading and storing a metafile, and downloading, installing, and executing said executable program code under control of said software license management means.

The present invention further provides a computer program product for a license management system, causing a computer system to perform said method.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A license management system for computer program applications, the system including an exchange network connecting a plurality of peer-to-peer network servers, wherein at least one network server of the plurality of peer-to-peer network servers acts as a provider server and at least one network server of the plurality of peer-to-peer network servers acts as a user server, and a network server of the plurality of peer-to-peer network servers is configured to perform a method, the method comprising:
   controlling program installations of executable program codes according to respective license regulations;
   storing the executable program codes to be distributed to the user server;
   generating and storing a first metafile including at least license information on licensing conditions for a first executable program code;
   sending, to the provider server, a request for transmission of a second metafile including at least license information on licensing conditions for a second executable program code, wherein the second metafile comprises geographical data specifying usage of the second executable program code as a function of geographical location;
   downloading and storing the second metafile from the provider server;
   receiving, from the user server, a request for transmission of the first metafile for the first executable program code and the second metafile for the second executable program code;
   sending, to the user server, the first metafile for the first executable program code and the second metafile for the second executable program code, the first metallic being specific to the first executable program code and the second metafile being specific to the second executable program code; and
   downloading, installing, and executing at least one executable program code under the controlling of program installations according to the respective license information on licensing conditions for the at least one executable program code.

2. The license management system according to claim 1, wherein the provider server has distributed server architecture, and wherein:
   storing the executable program codes comprises storing the executable program codes in at least one update-file server; and
   storing the first and second metafiles comprises storing the first and second metafiles in at least one license server.

3. The license management system according to claim 1, wherein
   downloading, installing, and executing an executable program code of the at least one executable program code comprises extracting from a metafile specific to the executable program code a URL-address for downloading the executable program code.

4. The license management system according to claim 1, wherein
   the downloading and storing the second metafile comprises communicating geographical data of the network server to the provider server.

5. The license management system according to claim 1, wherein
   downloading, installing, and executing an executable program code of the at least one executable program code is adapted to evaluate the license information from a metafile specific to the executable program code when the executable program code is executed.

6. The license management system according to claim 1, wherein the second metafile further comprises at least one of the following:
   a secure unique identifier for an update-file server;
   a unique identifier for a license server;
   restriction data for restricting usage of the executable program code as a function of a license period;
   a digital signature to confirm the correctness of the second metafile content.

7. A method for running a license management system, the method comprising:
   controlling program installations of executable program codes according to respective license regulations;
   distributing the executable program codes to requesting user servers from storage;
   generating and storing a first metafile including at least license information on licensing conditions for a first executable program code;
   sending, to a provider server, a request for transmission of a second metafile including at least license information on licensing conditions for a second executable program code, wherein the second metafile comprises geographical data specifying usage of the second executable program code as a function of geographical location;
   downloading and storing the second metafile from the provider server;
   receiving, from a user server, a request for transmission of the first metafile for the first executable program code and the second metafile for the second executable program code;
   sending, to the user server, the first metafile for the first executable program code and the second metafile for the second executable program code, the first metafile being specific to the first executable program code and the second metafile being specific to the second executable program code; and
   downloading, installing, and executing at least one executable program code under the controlling of program installations according to respective license information on licensing conditions for the at least one executable program code.

8. The method according to claim 7, wherein the executable program codes are located on at least one update-file server, and the first metallic and the second metafile are located on at least one license server.

9. The method according to claim 7, further comprising:
   extracting from a metafile specific to an executable program code of the at least one executable code a URL-address for downloading the executable program code.

10. The method according to claim 7, further comprising: communicating geographical data to the provider server.

11. The method according to claim 7, further comprising:

evaluating license information from a metafile specific to an executable program code of the at least one executable program code concurrently with executing the executable program code.

12. The method according to claim 7, wherein the second metafile further comprises at least one of the following:
   a secure unique identifier for an update-file server;
   a unique identifier for a license server;
   restriction data for restricting usage of the executable program code as a function of a license period;
   a digital signature to confirm the correctness of the second metafile content.

13. A computer program product for a license management system, the computer program product comprising:
   a non-transitory computer readable storage medium readable by a processing circuit and storing instructions for execution by the processing circuit for performing a method comprising:
      controlling program installations of executable program codes according to respective license regulations;
      distributing the executable program codes to requesting user servers from storage;
      generating and storing a first metafile including at least license information on licensing conditions for a first executable program code;
      sending, to a provider server, a request for transmission of a second metafile including at least license information on licensing conditions for a second executable program code, wherein the second metallic comprises geographical data specifying usage of the second executable program code as a function of geographical location;
      downloading and storing the second metafile from the provider server;
      receiving, from a user server, a request for transmission of the first metafile for the first executable program code and the second metafile for the second executable program code;
      sending, to the user server, the first metafile for the first executable program code and the second metafile for the second executable program code, the first metafile being specific to the first executable program code and the second metafile being specific to the second executable program code; and
      downloading, installing, and executing at least one executable program code under the controlling of program installations according to respective license information on licensing conditions for the at least one executable program code.

* * * * *